Patented Aug. 28, 1934

1,971,522

UNITED STATES PATENT OFFICE 1,971,522

ADHESIVE

Henry V. Dunham, Bainbridge, N. Y.

No Drawing. Application August 12, 1932,
Serial No. 628,615

20 Claims. (Cl. 134—17)

The present invention relates to a novel adhesive, prepared from dried milk and urea or a substitute for urea, as hereinafter described. The object of the invention is to produce an adhesive having certain very unusual properties, in a practical and satisfactory manner.

Casein has long been used as the base of adhesives, and casein has been used in conjunction with urea in certain instances. Experimentation has shown that dried milk, when used in conjunction with urea does not behave in the same manner as casein, although it is well known that dried milk contains a large percentage of casein. It appears probable that acid casein, which has heretofore been principally used in adhesives, has been modified by the acid used in precipitating the casein, and casein precipitated by rennet is modified in a different manner (and is termed "para casein" in the prior literature) and dried milk contains casein which has been modified in a different direction, by the heat during the drying operation. So far as I am advised, no satisfactory adhesive has heretofore been made from dried milk although attempts have been made in this direction.

Many processes are known for drying milk, spray-dried milk and milk dried on a rotary drum drier are probably the most satisfactory. I note that in drying milk, by the processes which are in commercial use, it is not usual to first add mineral acids or organic acids or other agents which could coagulate casein. In accordance with the preferred embodiment of the present invention, dried skim milk is used, and heretofore it has been the usual practice to make dried milk from skim milk, although whole milk could be employed, but the same is much more expensive, and for this purpose (i. e. for the purpose of the present invention) dried whole milk does not seem to be quite as satisfactory as dried skim milk. Experimentation has shown that dried skim milk (dried by any of the commercial processes) does not act like casein, when treated with alkalies and/or alkaline earths, and particularly dried milk (including dried skim milk) does not act the same as casein when treated with urea or substitutes therefor as indicated herein. Accordingly dried milk cannot be substituted for casein, in casein glue formulas, with the production of a satisfactory adhesive.

I have found that an adhesive having exceptionally good properties in some respects, can be made from dried milk powder, by dissolving it in water with the aid of a dispersing substance of the amide class, such as urea, thiourea, acetamide or a substance capable of producing such amide by intra molecular rearrangement, for example ammonium thiocyanate.

The following proportions of ingredients have been found to give very satisfactory results, but other proportions can be employed.

|  | Parts |
|---|---|
| Dried skim milk powder | 100 |
| Dispersing agent (urea) | 100 |
| Water | 75 |

In this formula and throughout the specification, parts are given by weight.

Upon mixing the three materials in the proportions here indicated, it is found that the skim milk powder dissolves rather rapidly, and after being allowed to stand for about 1 or 2 hours, the mixture has the consistency of fairly heavy condensed milk. Tested on a Stormer viscosimeter, at 70° F., it showed a reading of about 125 R. P. M., after the solution has been prepared for about one hour. This product is of about the color and appearance of light colored strained honey. When the composition is freshly made up, it will be found to be practically impossible to dilute this to any extent with water, without precipitating a part at least of the substances. Yet after the mixture has stood for 2 to 4 days, it can be diluted with substantial amounts of water without causing any precipitation. If rubber latex concentrate, for example of 60% concentration, is added to the freshly dissolved mixture, a thickening effect is produced, and the resulting product will have little if any flow. However if the mixture of dried skim milk powder, water and amide, is allowed to stand for 2 to 3 days, more or less, then 60% latex can be added to the resulting mixture, and a free flowing composition will be produced, which will be free flowing even if kept for several days. This and other experiments indicate that there is some sort of an aging operation going on in the mixture after it has been made up.

It will be understood that the proportions above referred to can be substantially modified without departing from the scope of the invention. Of the different amide compounds above referred to, urea seems to give more desirable results than any of the others, and it gives very desirable physical properties to the resulting solution. It is also cheaper than the other compounds referred to.

Certain other desired formulas are as follows:—

No. 2

|  | Parts |
|---|---|
| Urea | 20 |
| Dried milk | 80 |
| Water | 100 |

No. 3

|  | Parts |
|---|---|
| Urea | 60 |
| Dried milk | 40 |
| Water | 100 |

Of these two formulas the flow and consistency are of course quite different from each other and from the example given above. Formula No. 2 does not seem to be so sticky as No. 1 or No. 3. Formula No. 3 gives a very thin liquid, which is somewhat less cohesive than No. 2, but having very desirable properties in other respects, for example flow. Formulas No. 2 and 3, after being made up, and even when freshly made, (and with latex added thereto) can be used direct for gluing up non-waterproofed sheets of regenerated cellulose and similar types of paper material, for example gluing-this to paper or another non-waterproof regenerated cellulose sheet. Such glues can also be used for general purposes. Casein glues are generally unsatisfactory for gluing up sheets of regenerated cellulose. I call attention to the fact that in all of the formulas given hereinabove, the amount of water is not substantially greater than the combined amounts of the other components (and in some cases it is substantially less).

If concentrated (60%) rubber latex is to be used, the proportion of this to be added can vary, for example from 1 part up to 2 parts (more or less), per 1 part of the liquid glue, and the latex is in all cases preferably added after allowing the mixture to stand for at least a day. The latex can also be used in natural condition.

Dried milk can be made by many processes, and very satisfactory results have been secured by using both the spray-dried skim milk and the roller process dried skim milk.

Alkalies can be added to the mixture if desired, but generally there does not appear to be any material advantage, and accordingly in most cases such addition is not desirable.

Formaldehyde, softening agents such as glycerine, diethyl glycol and the like can be added. Non-aqueous liquids such as alcohols, acetone, ethyl, or methyl ether of diethylene glycol, and the like may be used as diluents if desired.

I find that by adding formaldehyde, acetaldehyde, aldol and similar aldehydes, say 4 to 10 parts, per 200 parts of the liquid glue (and added for example after allowing the mixture to stand for an hour), the water-resistance of the glued joint is somewhat increased. These proportions can be varied between wide limits, and it is not necessary (but is sometimes helpful) to let the mixture stand for a time before adding the aldehyde.

Where water is referred to, this can be added at ordinary atmospheric temperature, or as drawn from the hydrant.

As stated above, when water is added to the freshly prepared solution of the glue base, there is a precipitation produced. It is of course not intended to imply that on adding water under such conditions, everything or even all the proteinaceous matter (or casein) will be precipitated.

In the appended claims, the term "comprising" is intended not to exclude the addition of other materials, examples of which are mentioned in the above text, for improving any specific property of the adhesive, e. g. the aldehydes or the concentrated latex.

I claim:—

1. An adhesive comprising dried milk and an amide as a dispersing agent.

2. An adhesive comprising a solution of dried milk and an amide, such solution, when freshly made not being capable of dilution with water without precipitation, but after being kept for about a day, being capable of dilution with water without precipitation.

3. An adhesive comprising a dispersion of dried milk in water, with an amide, and containing latex.

4. A process which comprises dispersing dried milk in a solution of an amide, aging the resulting dispersion, and thereafter incorporating the liquid with an aqueous material serving as a modifying agent.

5. An adhesive containing a dispersion of dried milk and an amide, in an aqueous vehicle, the same being suitable for joining regenerated cellulose films.

6. An adhesive composition comprising a solution of dried milk and an amide, and rubber latex.

7. An adhesive composition comprising a solution in water of dried milk and an amide, the amount of water being not substantially greater than the combined amounts of the dried milk and of amide.

8. A process of making an adhesive from normal skim milk, which comprises drying said milk by any of the standard milk-drying processes, and mixing the dried product with an amide and with water.

9. A process which comprises dispersing dried milk in a solution of an amide, aging the resulting dispersion, and thereafter incorporating the liquid with latex.

10. An adhesive comprising non-acid dried milk and an amide as a dispersing agent.

11. An adhesive comprising a solution of non-acid dried milk and an amide, such solution, when freshly made not being capable of dilution with water without precipitation, but after being kept for about a day, being capable of dilution with water without precipitation.

12. An adhesive comprising a dispersion of non-acid dried milk in water, with an amide, and containing latex.

13. An adhesive containing a dispersion of non-acid dried milk and an amide, in an aqueous vehicle, the same being suitable for joining regenerated cellulose films.

14. A process of making an adhesive from skim milk, which comprises drying said milk by any of the standard milk-drying processes in the absence of added acid, and mixing the dried product with an amide and with water.

15. An adhesive comprising a dispersion of dried milk in water, with an amide, such composition being free from added latex.

16. An adhesive comprising a dispersion of dried milk in water with urea as a dispersing agent.

17. An adhesive comprising a dispersion of dried milk in water with thiourea as a dispersing agent.

18. An adhesive comprising a dispersion of dried milk in water with acetamide as a dispersing agent.

19. An adhesive comprising a dispersion of dried milk in water with an amide as a dispersing agent, and an agent capable of increasing the water-resistance of the glued joint.

20. An adhesive comprising a dispersion of dried milk in water with an amide as a dispersing agent, and an aldehyde capable of increasing the water-resistance of the glued joint.

HENRY V. DUNHAM.